United States Patent [19]

Tanaka et al.

[11] 4,309,137
[45] Jan. 5, 1982

[54] BLIND RIVET

[75] Inventors: Toshie Tanaka, Machida; Kunio Hara, Kawasaki, both of Japan

[73] Assignee: Nifco Inc., Yokohama, Japan

[21] Appl. No.: 18,381

[22] Filed: Mar. 7, 1979

[30] Foreign Application Priority Data

Mar. 9, 1978 [JP] Japan .................... 53-29065[U]

[51] Int. Cl.³ ............................................. F16B 13/06
[52] U.S. Cl. ............................................. 411/45; 411/70
[58] Field of Search ................. 85/70, 71, 73-78, 85/80, 82-84; 24/73 A, 73 P, 73 D, 73 PF, 73 SM

[56] References Cited

U.S. PATENT DOCUMENTS

| 2,795,989 | 6/1957 | Koenig | 85/78 |
| 3,369,289 | 2/1968 | Gapp | 85/77 X |
| 3,878,760 | 4/1975 | Jeal et al. | 85/77 |
| 4,143,580 | 3/1979 | Luhm | 85/77 |
| 4,168,650 | 9/1979 | Dahl et al. | 85/70 |

FOREIGN PATENT DOCUMENTS 2302442  9/1976  France ................................ 85/71

Primary Examiner—William E. Lyddane
Attorney, Agent, or Firm—J. R. Halvorsen; T. W. Buckman

[57] ABSTRACT

A blind rivet of plastic material, comprising a shank and a rivet body disposed round the shank and separated into an upper portion and a lower portion such that, when the shank is lifted up relative to the rivet body for the purpose of binding given panels, one of the upper and lower portions of the rivet body is caused to ride over the other of the aforementioned two portions and consequently the rivet body as a whole is expanded outwardly in the radial direction, enabling the panels to be pressed tightly against each other and secured fast in position.

4 Claims, 18 Drawing Figures

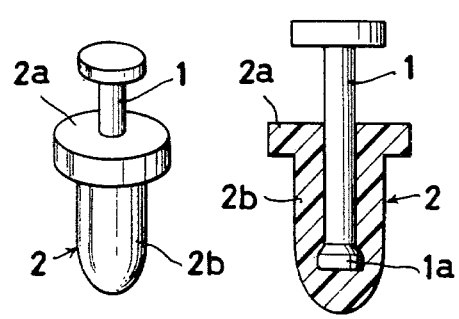
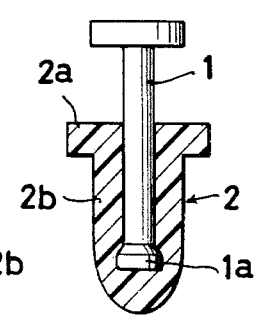
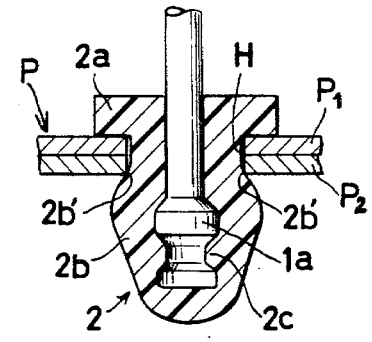
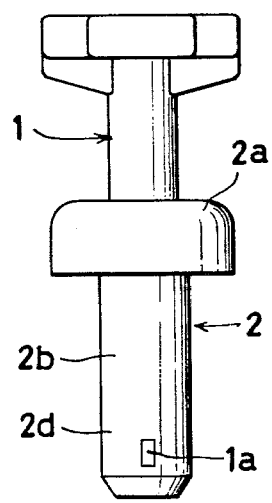
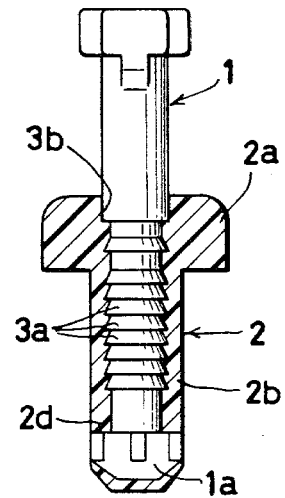

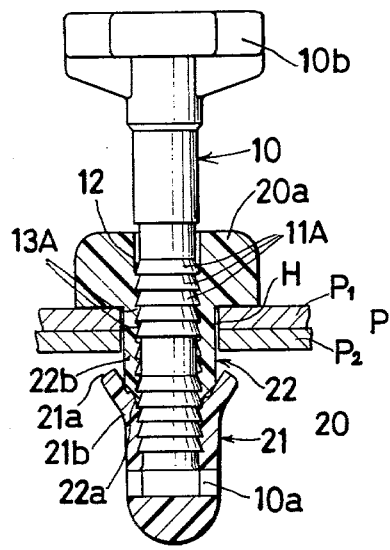
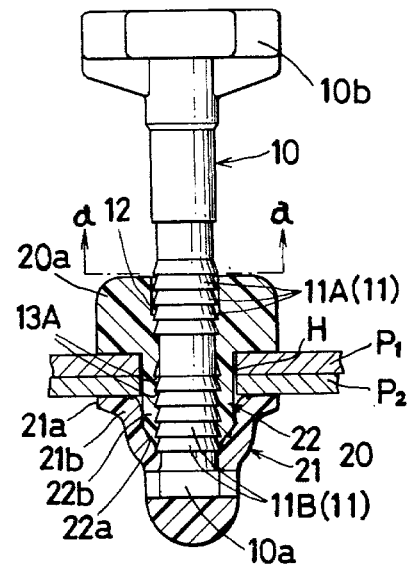
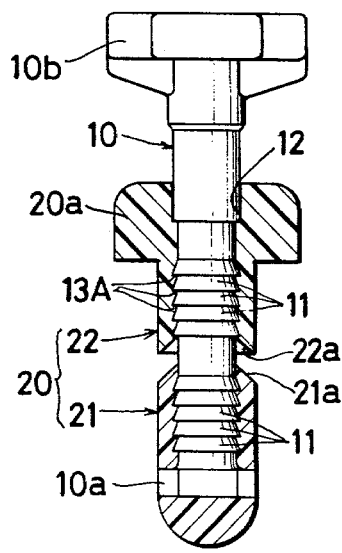
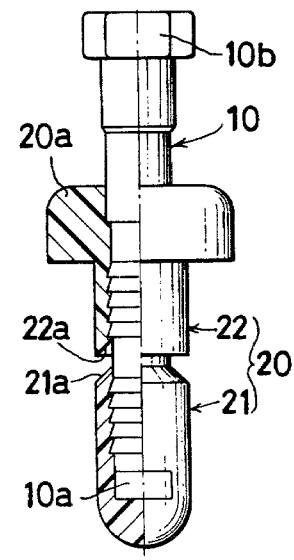

BLIND RIVET

BACKGROUND OF THE INVENTION

This invention relates to a blind rivet of a construction such that the blind rivet can be used for fastening itself to a fitting hole perforated in a given part or, in the case of a part composed of a plurality of members, for binding the plurality of members mutually to one another into a unitary part by a simple operation of lifting the shank thereof upwardly relative to the rivet body on one side of the part and that once the desired fastening is completed, the blind rivet seals the opposite openings of the fitting hole in the part with a high degree of water-tightness.

The conventional blind rivets also include those of a simple basic construction wherein the shank is made of a metallic material and provided at the leading end thereof with an expanded portion and the rivet body is made of a synthetic resin and disposed round the shank, so that desired fastening of the rivet to a given part is accomplished by lifting the shank upwardly relative to the rivet body and consequently causing the rivet body to be expanded outwardly in the radial direction and pressed against the part. After the shank has been lifted up, the head portion of the rivet body must be caulked to fasten the shank in its lifted position to the rivet body. Thus, the blind rivet is not bound with ample stability to the part and the binding force exerted by the rivet on the part is often insufficient.

Other blind rivets developed to date have a basic construction similar to the construction described above, except for a modification wherein the rivet body is separated into an upper portion and a lower portion provided respectively with male screw means and female screw means as shown in U.S. Pat. No. 3,521,521. In this case desired fastening of the blind rivet to a given panel part is accomplished by rotating the shank and consequently allowing the two portions of the rivet body to be brought into engagement with the lower portion overlapping the upper portion, so that the rivet body as a whole is expanded outwardly in the radial direction and pressed tightly against the panel part.

In the blind rivet of this construction, however, the operation of rotating the shank is troublesome and the operability of the blind rivet is notably inferior. Moreover, the strength of the radially expanded rivet body is inferior because of the formation of screw threads thereon.

For the purpose of remedying the various shortcomings suffered by the conventional blind rivets, the inventors of the present invention have proposed blind rivets of a basic construction wherein the rivet body is bent outwardly in the radial direction and finally folded over itself by the upward lift of the shank and, consequently, the rivet body is expanded radially.

These blind rivets of the present inventors are excellent in the ginding force they exert upon the given panel parts, provide ample water-tightness for the openings in the panel parts and enjoy high practical utility. Thus, they have found favorable acceptance in the market.

An object of the present invention is to make further improvements in the blind rivets proposed to date by the inventors and provide a blind rivet of plastic material which has a high binding force and water-tightness, excels in operability and riveting effect and has good tolerance to variation in the thickness of panel parts.

SUMMARY OF THE INVENTION

To accomplish the object described above according to the present invention, there is provided a blind rivet which comprises a shank provided on the outer surface thereof with a plurality of annular locking or checking means and a rivet body disposed around the shank, separated into an upper portion and a lower portion and provided on the inner surface thereof with engaging means complementary to the aforementioned checking means on the shank, with the opposed end surface of either the upper portion or lower portion of the rivet body tapered in the direction of the remaining one of the two portions.

Desired fastening of this blind rivet to given panels is accomplished by inserting the blind rivet into a fitting hole perforated in advance in the panels and pulling the shank through the head and away from the rivet body. The upward pull of the shank consequently causes either the upper or lower portion of the rivet body which possesses no tapered peripheral surface to ride over the remaining one of the two portions, with the result that the rivet body is expanded outwardly in the radial direction and pressed against the panels with force enough to fasten the panels in position. After the panels have been amply bound owing to the radial expansion of the rivet body, the locking means of the shank and the complementary engaging means of the rivet body are relied upon to keep the shank from sliding back to its original position and enhance the force with which the panels are bound fast.

The other objects and characteristic features of the present invention will become apparent from a detailed description of the invention to be given hereinafter with reference to the accompanying drawing.

BRIEF EXPLANATION OF THE DRAWING

FIGS. 1A, 1B and 1C are respectively, a perspective view of a typical conventional prior art blind rivet adapted specifically for improving water-tightness, a longitudinally sectioned view of the same blind rivet and a longitudinally sectioned view of the same blind rivet in mounted position in given panels.

FIGS. 2A, 2B, 2C and 2D are, respectively, a front view of another type of blind rivet which is the subject matter of commonly owned copending U.S. Application Ser. No. 012,981, filed Feb. 21, 1979; a longitudinally sectioned side view of the same blind rivet; a longitudinally sectioned view of the same blind rivet in a process of being operated for attachment to given panels; and a longitudinally sectioned view of the same blind rivet in the position assumed upon completing of the binding operation.

FIGS. 3B, 3C, 3D and 3E are, respectively, a partially cutaway longitudinally sectioned view of the first embodiment of the blind rivet of the present invention; a side view of the blind rivet; a longitudinally sectioned view of the blind rivet in the process of being operated for attachment to given panels; and a longitudinally sectioned view of the blind rivet in the state assumed upon completion of the binding operation.

FIGS. 4A, 4B, 4C and 4D, are repsectively, a longitudinally sectioned front view of the second preferred embodiment of the blind rivet; a partially sectioned side view of the blind rivet; a longitudinally sectioned front view of the blind rivet in the process of being operated for attachment to given panels; and a longitudinally sectioned front view of the blind rivet in a state assumed upon completion of the binding operation.

DETAILED DESCRIPTION

Figure 2C:
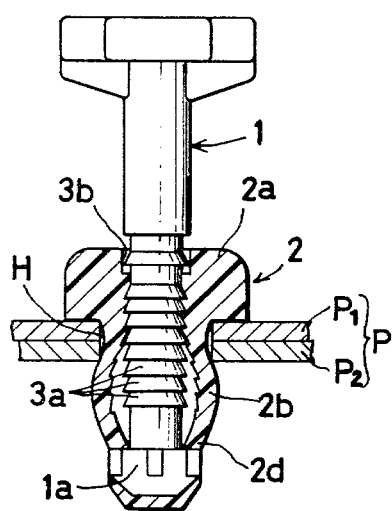

This invention relates to a blind rivet comprising a shank and a rivet body disposed around the shank, so that the fastening of the blind rivet is accomplished by inserting the rivet through a fitting hole perforated in advance in the panels and subsequently pulling the shank through the head and away from the rivet body and consequently causing the rivet body to expand outwardly in the radial direction.

First, two types of blind rivets will be described with reference to FIGS. 1 and 2.

In the first blind rivet illustrated in FIGS. 1A through 1C, a shank 1 has its leading portion 1a swelled out and concealed in a blind rivet body 2 which is disposed around the shank. When the blind rivet is inserted into the fitting hole perforated in advance in a given part P with the lower end (tip) of the rivet body in the lead as illustrated in FIG. 1C and subsequently the shank 1 is pulled up away from the part with the head portion 2a of the rivet body pressed against the part, the swelled leading portion 1a of the shank slides up the interior of the rivet body while applying outward pressure to the cylindrical wall portion 2b of the rivet body, extends the rivet body radially and presses it against the edge of the fitting hole on the opposite side. The pressure thus applied serves to retain the part fast in position. If the part happens to consist of two members $P_1$, $P_2$, therefore, the blind rivet can bind the two members with each other. In terms of the water-tightness the fitting hole is expected to acquire in consequence of the binding with the blind rivet, one of the opposite edges of the fitting hole is held in two-dimensional contact with the lower surface of the head portion of the rivet body and the other edge is kept in two-dimensional contact with the entire periphery of one surface portion 2b' of the cylindrical wall portion 2b of the rivet body. Thus, the blind rivet appears to close the two openings of the fitting hole with satisfactory water-tightness. Since the cylindrical wall of the rivet body is completely blind and the interior thereof thoroughly closed, there is substantially no leakage of any fluid through the space formed between the outer surface of the shank 1 and the inner wall of the rivet body.

From the practical point of view, however, this rivet has a problem in its basic function of binding and, consequently, fails to provide highly reliable water-tightness. The first drawback resides in the deficiency of binding force. Since this blind rivet requires the completely blind, cylindrical wall of the rivet body to be expanded in the shape of a beer barrel, the rivet body must inevitably be made of a synthetic resin so as to permit the radial expansion of the rivet body by resilient deformation. The rivet body, if made of a metallic material which is capable only of plastic deformation, does not serve the purpose of radial expansion because it does not permit sufficient radial expansion. Even the resilient deformation obtainable with the rivet body of a synthetic material has its limits, so that the radial expansion of the rivet body is not very large for the distance of the upward pull of the shank. Thus, the force with which the expanded rivet body is pressed against the edge of the fitting hole is not generally sufficient. Of course, the extent to which the rivet body is radially expanded may be considerably increased by giving the rivet body a great length and proportionally increasing the diameter of the swelled leading portion 1a of the shank. In such a case, however, the blind rivet has a very large size, so large in fact as to deprive the rivet of its practicability.

The fact that in its practical size, the blind rivet fails to provide sufficient binding force means that the force with which the blind rivet seals the fitting hole is also insufficient and that the blind rivet fails to provide reliable water-tightness.

When the blind rivet has been bound to the panel by the upward pull of the shank, the portion of the shank which protrudes from the rivet body serves no further purpose and is generally removed. The blind rivet has no effective means for positively retaining the remaining shank fast in position. Possible return of the shank to its original position is prevented merely by virtue of the bulges 2c which are formed in the inner surface of the cylindrical wall of the rivet body immediately behind the swelled leading portion 1a. Since the rivet body is made of a resilient material, the resilient force exerted by the material acts upon the shank and may possibly cause the shank to retract particularly when the rivet body is exposed to external vibration. Thus, it is quite possible that the blind rivet's function of binding itself will be impaired as a result.

Figure 2D:
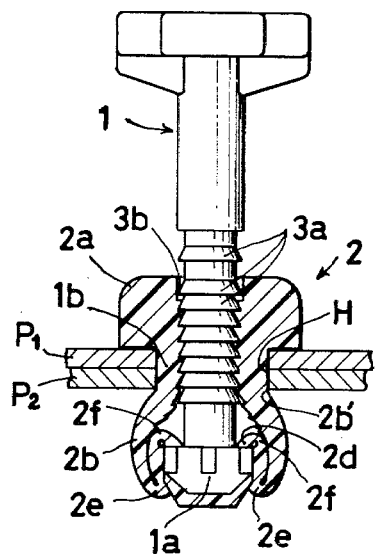

Now, the blind rivet of a construction of FIGS. 2(A) through 2(D) which is an improvement in the blind rivet touched upon above will be described. The blind rivet, covered by co-pending application Ser. No. 12,981, filed Feb. 21, 1979 and assigned to the common assignee of the present application, is similar to the former one in the respect that a blind rivet body 2 is disposed around a shank 1 and the rivet body is provided at the upper end thereof with a head portion 2a. It is, however, characterized by the fact that a laterally extending part 1a of the lower portion of the shank 2 and a part 2d of the lower portion of the rivet body are inseparably bound to each other. This blind rivet is inserted in the direction of the lower portion of the rivet body into the fitting hole H perforated in advance in a part P composed of members $P_1$, $P_2$, as touched upon in the first type of blind rivet, and the shank is pulled up away from the head portion 2a which is held down against the part. At first, the upward pull of the shank only causes the cylindrical wall of the rivet body to expand outwardly in the shape of a beer barrel as illustrated in FIG. 2C. As the upward pull of the shank is continued, the lower portion 2d of the rivet body rises in conjunction with the lower portion 1a of the shank because of their inseparable union. Consequently, the portion of the cylindrical wall of the rivet body below the portion at which the cylindrical wall has so far expanded to the greatest extent is bend inwardly as at 2e and eventually tucked in under the portion 2b as shown in FIG. 2(D).

In the illustrated state which the blind rivet assumes upon completion of the binding operation, the upper portion of the rivet body which consequently comes into contact with the edge of the fitting hole is amply expanded outwardly in the radial direction by the thickness of the lower portion 2f tucked in thereunder. As the pressure with which the surface portion 2b' of the cylindrical wall which has collided into the edge of the fitting hole is increased as described above, the water-tightness provided by this blind rivet for the fitting opening is considerably enhanced. Further, since the rivet body is bent and folded over itself, it proportionately increases the overall volume of the blind rivet which finally protrudes from the reverse surface of the panel and produces a force which tends to expand radially the portion 1b of the rivet body enclosed inside the fitting hole. Thus, this improved blind rivet serves the purpose of adding to the binding force and enhancing the water-tightness afforded the fitting hole.

Another advantage enjoyed by the improved blind rivet resides in the fact that a series of locking means 3a is disposed over a suitable length in the longitudinal direction on the outer surface of the shank 1 and at least one complementary engaging means 3b is disposed on the inner wall of the rivet body in such a way as to come into locked engagement with the series of locking means 3a, so that when the upward pull of the shank is stopped after the blind rivet has been sufficiently bound to the panel, the resilient force which the rivet body exerts by virtue of the resiliency of its own in the direction of resuming its original position is transformed into a force which tends to enhance the engagement between the aforementioned locking means 3a and the engaging means 3b. The blind rivet, therefore, keeps its binding force always in a fair excess after it has been bound to the panel.

In spite of such outstanding merits, the improved blind rivet nevertheless has a disadvantage; since the rivet body 2 is deformed immoderately, there is a fair possibility of cracks being produced where the cylindrical wall of the rivet body is sharply bent such as along the portion 2e which forms the borderline between the upper portion of the rivet body and the lower portion thereof to be tucked in under the aforementioned upper portion or along the portion 2f which forms the borderline between the aforementioned lower portion and the lower edge 2d of the rivet body, particularly when the flow of resin texture involved during the molding of the rivet body lacks uniformity.

The type of blind rivet described above is such that the colliding portion 2b' which is primarily designed to come into contact with one of the edges of the fitting hole opposite the other edge intended for contact with the head portion of the rivet body has substantially line contact with the entire circumference of the edge of the fitting hole.

In another construction not shown, the rivet body is adapted to come into planar contact with the surface of panel surrounding the edge of the fitting hole. For example, the rivet body to be disposed round the shank is divided into an upper portion and a lower portion, and the outer wall of the upper portion has its wall thickness gradually decreased in the direction of the lower end is provided with a male thread while the inner wall of the lower portion is provided with a female thread so that the rotation of the shank causes the female thread in the lower portion to ascend spirally along the male thread on the upper portion and consequently enables the lower portion of the rivet body to move up the outer wall of the upper portion with a gradual increase in its diameter until the colliding end face of the lower portion comes into intimate contact with the reverse surface of the part and establishes planar contact with the entire circumferential area of the edge of the filling hole.

The blind rivet of this planar contact construction, however, necessitates the troublesome work of requiring a large number of rotations to the shank and, as the result, suffers from very poor installation efficiency. Besides, from the standpoint of fabrication, this latter blind rivet involves the extra work of forming threads in the upper and lower portions of the rivet body. Especially, the lower portion of the rivet body requires the female thread to be cut on the inner wall thereof before it is combined with the shank. Thus, the fabrication of this blind rivet proves to be both complicated and expensive. Moreover, since the aforementioned spiral engagement of the two threads is expected to fulfil the function of radially expanding the lower portion of the rivet body in combination with the function of preventing the shank and consequently the lower portion of the rivet body from moving in the direction of their original positions from the respective positions assumed after completion of the binding operation of the blind rivet, the blind rivet fails to manifest the advantage that the binding of the blind rivet to the panel is attained simply by the upward pull of the shank and the required restraint of the motion of the shank relative to the rivet body is automatically attained by simply discontinuing the upward pull of the shank is not manifested by this blind rivet. This may be a possible reason for the drawbacks mentioned above. In the blind rivet of this screw threaded construction, at least the lower portion of the rivet body must be formed of a material possessing resiliency, indicating that upon the spiral engagement of the two threads, the resiliency imparts on the two threads a force urging them to regain their original shapes. As a result of this resiliency, there is a possibility that, when this blind rivet fixed to a given part is exposed to external shocks, the threads will come out of engagement and the blind rivet's function of binding the part will be impaired.

The present invention, therefore, has a main object of providing a blind rivet which is manufactured by a simple technique of fabrication and enjoys sufficient water-tightness and binding force. To meet varying uses, the blind rivet of this invention can be designed for the purpose of permitting the forced linear contact of the part of the rivet body with the edge of the fitting hole as contemplated by the blind rivets illustrated in FIGS. 1 and 2 or for the purpose of producing planar contact of the rivet body with the circumferential areas of the fitting hole as was previously described by a screw mechanism blind rivet. When the present blind rivet is designed for linear contact, it produces ample compressive force without exposing the rivet body to the possibility of undergoing excessive deformation such as of twisting and producing cracks therein. When it is designed for the planar contact, the contact is attained simply by the upward pull of the shank similarly to the linear contact and the locked engagement of the shank and the rivet body is automatically attained by discontinuing the upward pull of the shank at the time that the binding operation is completed. Thus, an auxiliary object of the present invention is provide a blind rivet which has means for radially expanding the rivet body and engaging means for locking the blind rivet in its final form which are independent of each other and which is easy to manufacture. Although the planar contact which results in closure of the circumferential area of the edge of the fitting hole does not provide any radial expansion of the enclosed portion of the cylindrical wall of the rivet body within the aperture, the nevertheless is enjoyed an advantage that the force with which the aforementioned closure is effected functions as a binding force upon the part and, consequently, provides stable retention of the blind rivet to the part.

Now the illustrated preferred embodiments of this invention will be described in detail. The description will be started with the first preferred embodiment shown in FIGS. 3A through 3E, which contemplates the planar contact of the rivet body with the circumferential area adjacent to the edge of the fitting hole.

Figure 3A:
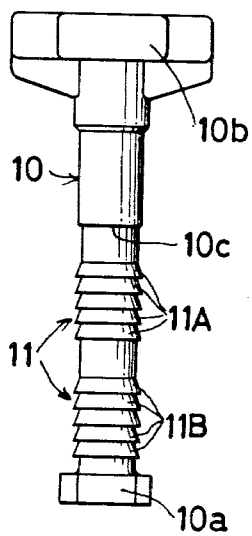
FIG. 3A is a front elevational view of a shank to be used in the first preferred embodiment of the blind rivet according to the present invention.

FIG. 3A illustrates a shank 10 which may be used in the preferred embodiments of the present invention. Spaced along an intermediate portion of the length of shank 10 from the lower laterally extending portion 10a to the head portion 10b, are disposed a series of toothed locking steps 11 each tapered in the direction of the head portion to form positive shoulder means facing away from the head portion. The head portion 10b has a rather complicated "T"-shape which is in conformity with the shape of a tool (not shown) exclusively designed for the purpose of gripping the head portion in the upward pull of the shank while the completed blind rivet is being bound to the given part. Where no use of such a special tool is contemplated, the head portion may be in a much simpler shape. It need not be formed specifically to have a diameter larger than the diameter of the shank but may be formed to have the same diameter.

In the present preferred embodiment, the series of toothed locking steps 11 are divided into two groups 11A, 11B, which are separated by a smooth portion for a certain distance for a reason to be explained afterwards.

The material of the shank 10 itself is not particularly limited. In consideration of the fact that the rivet body to be disposed round the shank is required to possess resiliency and, therefore, is formed of a synthetic resin, the shank is preferably to be made of a synthetic resin of a type such that the rivet body may be molded around the pre-molded shank by a simple method such as, for example, the two-state plastic molding technique.

Figure 3B:
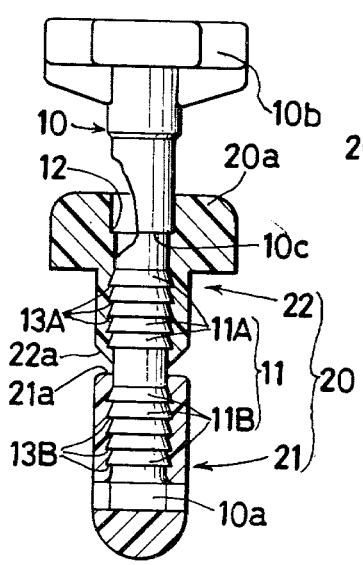
Figure 3C:
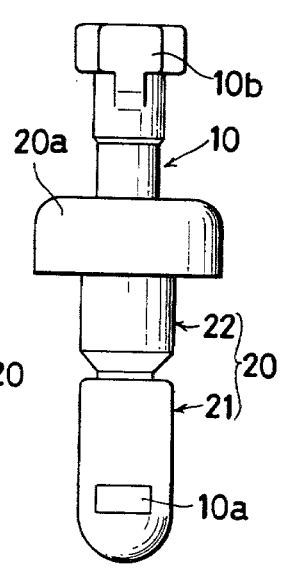
Figure 4C:
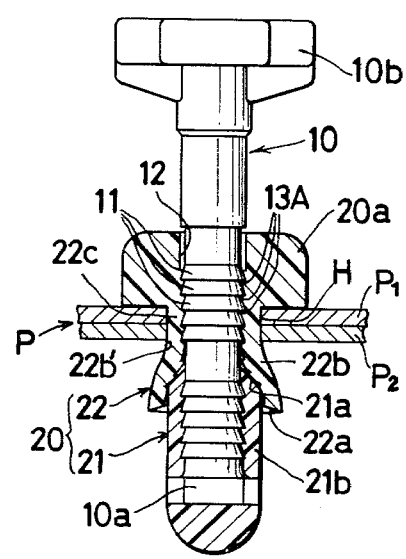
Figure 4D:
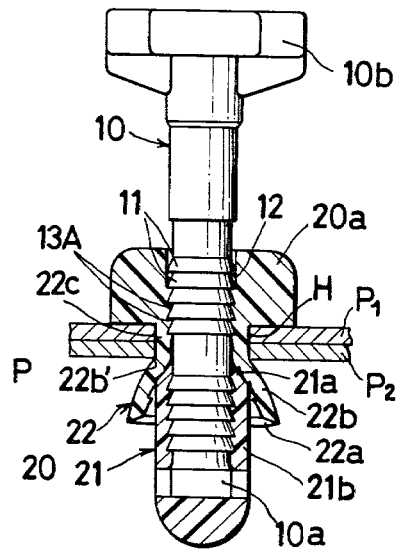

The present preferred embodiment will be described on the assumption that the blind rivet is completed by placing the shank 10 illustrated in FIG. 3A in the cavity of a second metal die for the rivet body and injection molding the rivet body round the shank within the cavity. As illustrated in FIGS. 3B and 3C, the rivet body 20 disposed round the shank is divided into a lower rivet portion 21 which has the lower end thereof joined with the laterally extending lower portion 10a of the shank and the cylindrical wall thereof molded around the lower group of toothed locking steps 11B and an upper rivet portion 22 which is molded around the upper group of toothed locking steps 11A. Upper rivet portion 22 then extends upwardly into a head portion 20a having a diameter substantially greater than portion 22. The cylindrical walls of the upper and lower rivet portions are both substantially circumferentially continuous and, especially in the present preferred embodiment, the opposed end surfaces 22a, 21a thereof are separated by a certain distance in the axial direction of the blind rivet. Through this intervening space, the substantially smooth intermediate portion of the shank 10 is exposed to sight.

Inside the rivet body 20, particularly on the inner wall of the upper rivet portion 22, there is formed at least one engaging means 12 complementary to the toothed locking means 11 of the shank. When the blind rivet is molded by the two-stage plastic molding technique as assumed above, the stepped portion 10c which is formed on the shank close to the head portion 10b of the shank 10 and in a position corresponding to an intermediate level of the entire height of the head portion 20a of the rivet body serves to give this engaging means 12 its shape. At the same time, the toothed locking steps 11 on the shank, the upper group of toothed locking steps 11A to be more exact, serve to give a shape to auxiliary engaging steps 13A. Where the stepped portion 10c is not formed on the shank and consequently the engaging means 12 is not formed inside the head portion 20a of the rivet body, the auxiliary engaging steps 13A formed on the rivet body in conformity with the upper group of toothed locking steps 11A on the shank function as a principal locking means. Similarly, the lower group of toothed locking steps 11B of the shank give a shape to auxiliary engaging grooves 13B inside the lower rivet portion 21. As will be understood from what will be described afterward, these lower grooves 13B are not meant for engagement.

The process of the attachment of the blind rivet to the fitting hole H perforated in the part P will now be described with reference to FIGS. 3D and 3E.

The rivet body 20 is passed in the direction of its lower end 21 through the fitting hole H until the head portion 20a of the rivet body is pressed against one side of the part P, which happens to consist of two members $P_1$, $P_2$ in the illustrated case. With the head portion thus pressed down against the part, the shank 10 is pulled up away from the part P. As a result, there occurs a vertical relative motion between the inner wall surface of the upper rivet body 22 and the shank, while the lower rivet portion 21 rises in conjunction with the shank because the lower section thereof and the lower portion 10a of the shank remain in a mutually joined state and function as a unitary joint. The upper end surface 21a of the lower rivet portion 21 comes into contact with the lower end surface 22a of the upper rivet portion 22.

In the present preferred embodiment, the lower end surface 22a of the upper rivet portion 22 is tapered in the direction of its lower end. After the opposed end surfaces 21a, 22a of the upper and lower rivet portions have collided into one another, further upward pull of the shank causes the upper end surface 21a of the lower rivet portion to ride over the tapered end surface 22a of the upper rivet portion, with the tapered end surface 22a serving as the guide. Additional portions of the cylindrical wall of the lower rivet portion is also led along the guide surface 22a with gradual radial expansion as seen in FIG. 3(D). By the time the shank is fully pulled up and brought to the limit of its travel, the greater part of the cylindrical wall 21b of the lower rivet portion 21 is superimposed over the cylindrical wall 22b of the upper rivet portion and, at the same time, expanded outwardly in the radial direction. About the same time, the end surface 21a of the lower rivet portion comes to collide at least perpendicularly with the circumferential area of the edge of the fitting hole H in the part P. At times when the upward pull of the shank is carried to the limit, the end surface 21a yields and deforms radially outwardly because of the resiliency of its material and comes into tight contact with the reverse side of the part P in the outwardly extended form as illustrated in FIG. 3E or in a form resembling a suction disc.

Because of this tight contact with sheet $P_1$ coupled with the presence of the head portion 20a of the rivet body, the blind rivet holds the part P fast in position and fastens itself securely to the part P. When the part P happens to consist of two members $P_1$, $P_2$ as illustrated, the blind rivet serves to bind the two members tightly together. Besides, the blind rivet provides safe and stable water-tightness to the fitting hole because one of the opposite edges of the fitting hole is sealed with the head portion 20a of the rivet body and the other edge with the end surface 21a of the lower rivet portion which has been brought into perfect contact as described above. When the upward pull of the shank is discontinued after the final state of attachment illustrated in FIG. 3E has been assumed, the locking means 11 provided on the shank snaps into engagement with the auxiliary engaging means 12 or 13A and shank 10 is prevented from resuming its original axial position, completing the binding operation.

The resiliency of the rivet body 20 which exerts a force in the direction of urging the rivet body to resume its original shape, namely in the direction of breaking the state of fast union established as described above, also conversely acts in the direction of increasing the force of engagement between the engaging means 11, 12 (13A) and contributes advantageously to the maintenance of the state of fast union. Actually, this union between the part P and the blind rivet is maintained so stably that it will not come loose even upon exposure to external shocks. After the fast union has been established as described above, the portion of the shank 10 which protrudes from the rivet body and serves no further purposes may be cut off along the line $\alpha$-$\alpha$. The separation of the useless protrusion of the shank also applies to the other embodiments to be described hereinafter.

In the illustrated preferred embodiment, the guide surface means which serves the purpose of allowing the lower rivet portion 21, after its collision with the upper rivet portion 22, to be superimposed over the upper rivet portion is formed by having the lower end surface 22a of the upper rivet portion tapered in the direction of the lower rivet portion. Alternatively, but not shown, the upper end surface 21a of the lower rivet portion may be tapered parallel to the tapered end surface of the upper rivet portion to warrant more thorough engagement of the two end surfaces; in other words, the two end surfaces 21a, 22a may be inclined complementarily to each other and used as guide means. Conversely, the lower end surface 22a which is tapered in the illustrated first embodiment shown in FIGS. 3(B) through 3(E), formed flat and the upper end surface 21a of the lower part 2 may instead be cut aslant on the inside.

The distance by which the upper and lower rivet portions 21, 22 are separated before the blind rivet is put to use may be freely selected; at times, no space need be interposed between the two portions and at other times a fairly large space may be interposed therebetween. In the present preferred embodiment, no toothed locking steps 11 are formed in the portion of the shank which is exposed through the space separating the upper and lower rivet portions. As will readily be understood from the description given above, there is no particular need for providing such toothed locking steps in that exposed portion of the shank because, unlike the portion of the shank which serves to give the shape of the auxiliary engaging means 13A on the inner wall surface of the rivet body by the two-stage plastic molding technique, toothed locking steps if formed in the aforementioned exposed portion of the shank have no particular function to fulfil in the course of the two-stage plastic molding operation and also because even in the absence of toothed locking steps in the exposed portion of the shank, at least one of the series of toothed locking steps in either of the upper and lower groups is allowed to come into engagement with the engaging means 12 or 13A on the rivet body after completion of the binding operation. The omission of toothed locking steps from the exposed portion serves the dual purpose of saving the material consumed and simplifying the metallic die used. It is naturally permissible to have the toothed locking steps 11 formed in a continuous series across the exposed portion of the shank to meet the convenience of the first metal die used for molding the shank (such as when the shank alone is used in combination with some other rivet, for example).

The toothed locking steps 11 formed in a continuous series on the shank may be in the form of grooves instead of ridges and the engaging means formed on the rivet body may be in the form of a projection instead of a groove.

In the first preferred embodiment described above, when the operation of the blind rivet is reviewed in terms of the relative function of the upper and lower rivet portions, the upper rivet portion appears first to serve as the guide means for the advance of the lower rivet portion and then to serve as the spearhead for its own forced entry into the interface between the lower rivet portion 21 and the shank 10. When the direction in which the guide means directs the advance of the lower rivet portion 21 is reversed, the lower rivet portion 21 can be caused to obtain its own forced entry into the interface between the upper rivet portion 22 and the shank 10. Another preferred embodiment involving this reversal of the guide means is illustrated in FIGS. 4A through 4D.

With reference to FIGS. 4A and 4B, the lower end surface 22a of the upper rivet portion 22 is cut aslant inwardly in the direction of the head portion 20a of the rivet body and, in the present case, the upper end surface 21a of the lower rivet portion 21 is cut aslant parallelly with the inclined surface 22a described above. These two mutually parallel end surfaces constitute the guide means. As already described, the inclination of the end surface may be limited to either of the two end surfaces.

In any event, the rivet body 20 of this blind rivet is inserted into the fitting hole H perforated in the part P and then the shank 10 is pulled upwardly away from the part P similarly to the aforementioned preferred embodiment. As the upward pull of the shank is continued even after the upper and lower rivet portions have collided into each other, the lower rivet portion 21 begins to wedge into the interface between the upper rivet portion 22 and the shank by virtue of the guide surface means formed as described above (FIG. 4C) and the cylindrical wall 22b of the upper rivet portion begins to expand outwardly in the radial direction and, at the same time, ride over the cylindrical wall 21b of the lower rivet portion.

When the shank 10 has been pulled to the limit of its travel, the lower rivet portion 21 reaches the recess of the interior of the upper rivet portion 22 and the upper rivet portion 22 fully expands in the radial direction and the portion 22b' of the cylindrical wall 22b which has confronted the edge of the fitting hole comes into tight contact with the edge under large compressive force. Although this contact occurs linearly, it substantially seals the entire circumference of the edge with sufficiently high water-tightness and also gives to the portion of the cylindrical wall enclosed within the fitting hole a force which tends to expand that portion in the radial direction. Although this blind rivet produces ample compressive force against the inner wall of the fitting hole similar to the other blind rivet illustrated in FIG. 2, it eliminates the possibility of being exposed to immoderate twisting force. Thus, this blind rivet enjoys an advantage that it sustains no flaw in the course of its manufacture and warrants high yield of manufacture.

Upon completion of the binding operation, the two engaging means 11, 12 (13A) catch hold of each other and this engagement functions to prevent the shank and the rivet body from resuming their original positions and contributes to stable maintenance of the blind rivet in its bound state in much the same way as in the preferred embodiment described above.

Figure 5A:
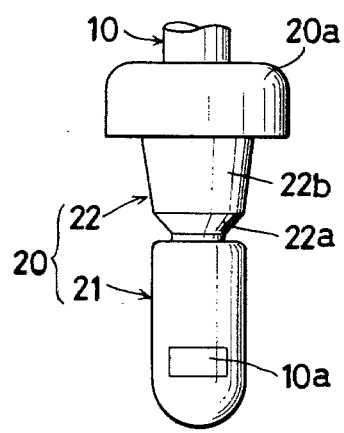
FIG. 5A is a side view of the third preferred embodiment of the blind rivet of this invention and FIG. 5B is a side view of the fourth preferred embodiment of the blind rivet of the present invention.
Figure 5B:
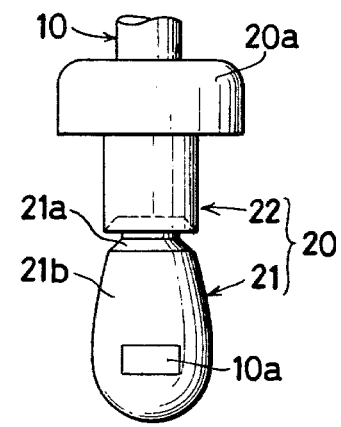

In the blind rivets of FIGS. 3 and 4, the entire cylindrical walls of both the upper and lower rivet portions are completely blind. Self-evidently, these blind rivets can provide perfect water-tightness insofar as either of the upper and lower rivet portions which is destined to ride over the other rivet portion (namely, the rivet portion which comes into direct engagement with the part P) has its cylindrical wall completely blind. Where the water-tightness through the route formed by the interface between the periphery of the shank and the inner wall surface of the rivet body must be taken into account, however, it is desirable that the entire cylindrical wall of both the upper and lower rivet portions should be completely blind. One possible measure for ensuring this water-tightness is to have the head portion 20a of the rivet body molded in the form of a suction disc. In the two preferred embodiments described above, smooth, effective radial expansion of the rivet portion (designed to ride over the other rivet portion) may be ensured by having the cylindrical wall of the rivet portion (desinged to force its way under the other rivet portion) cut aslant outwardly in the direction opposite the direction of the relative advance thereof toward increasing the radial expansion of the overriding rivet portion. In the case of the preferred embodiment illustrated in FIG. 3, for example, the cylindrical, wall 22b of the upper rivet portion 22 may be cut aslant outwardly in the direction from the upper end surface 22a to the head portion 20a of the rivet body as illustrated in FIG. 5A. In the case of the other preferred embodiment illustrated in FIG. 4, the cylindrical wall 21b of the lower rivet portion 21 may be cut aslant outwardly in the direction from the upper end surface 21a to the lower end.

Although the preferred embodiment have been described as being used for the purpose of binding a plurality of members $P_1$, $P_2$ . . . .

It goes without saying that, as frequently practiced in the past, the blind rivet of this invention can be utilized as a fastener when the rivet body thereof is suitable adapted so as to catch firm hold of a given article.

As described in detail above, the present invention overcomes all the drawbacks encounterd while the edge of the fitting hole on the side opposite that of the rivet body is sealed with the cylindrical wall of the rivet body by the linear-contact technique or the planar-contact technique which both combine merits and demerits. The blind rivet of this invention offers ample water-tightness and binding force and enjoys an advantage that the choice between the two techniques mentioned above can be made very easily as a matter of design.

What is claimed is:

1. A plastic blind rivet for use in an apertured panel, said rivet including a shank having an enlarged portion at each of the opposite ends thereof and a plurality of locking means provided on the outer surface of said shank in at least two axially spaced portions of said shank, a two piece upper and lower rivet body insert molded around said shank, said body including an encircling head portion having locking means and located at the upper end of one body piece spaced from one tubular wall with the interior surface of said wall having engaging means adapted to intimately mesh in complementary engagement with one portion of said shank locking means, the second body piece continuously enclosing said opposite enlarged end of said shank and having internal engaging means adapted to mesh in complimentary engagement with the second portion of said shank locking means, the end surfaces of said body pieces being in opposition at a point on said shank positioned intermediate the two portions of the shank carrying said locking means, the upper piece of the rivet body being provided with a guide surface tapered in the direction of the other of the opposed surfaces, whereby an upward pull of the shank away from the head of the rivet body causes the lower piece of the rivet body to slide on the guide surface of the upper piece until it is superimposed over the upper piece causing it to radially expand to form a generally flange-like member with its interior surface contacting said panel and press at least one given panel against the head of the rivet body and further to move said shank locking means into ratcheted locked engagement with the complimentary engaging means in the head and tubular portion of said upper rivet body piece, said two axially spaced portions of said locking means on said shank being separated by an axially smooth section on which said opposing ends of said rivet body pieces terminate.

2. A plastic blind rivet according to claim 1 wherein said enlarged ends of said shank are generally T-bar in configuration.

3. A plastic blind rivet according to claim 2 wherein said T-bar at said lower end of said shank is captured within the walls of said rivet body in spaced relation to the free end thereof.

4. A plastic blind rivet according to claim 1 wherein substantially all of said locking means on said shank and said engaging means on the inner wall of said rivet body are generally identically frusto-conical in size and configuration with the enlarged ends facing away from the head of said rivet to insure positive locking of said shank in its retracted position.

* * * * *